United States Patent
Suzuki et al.

(10) Patent No.: US 6,226,255 B1
(45) Date of Patent: May 1, 2001

(54) HIGH DENSITY OPTICAL RECORDABLE MEDIUM AND METHOD FOR RECORDING

(75) Inventors: Yuki Suzuki; Yuko Ohkijima; Takako Kobayashi; Yutaka Kurose; Shuuichi Maeda, all of Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/422,074

(22) Filed: Oct. 21, 1999

(30) Foreign Application Priority Data

Oct. 21, 1998 (JP) .................................................. 10-300063
Nov. 16, 1998 (JP) .................................................. 10-324733

(51) Int. Cl.$^7$ ...................................................... G11B 7/24
(52) U.S. Cl. ..................................... 369/275.1; 369/275.4; 428/64.4; 430/270.14
(58) Field of Search .............................. 369/275.1, 275.2, 369/275.4; 428/64.1, 64.4; 430/320, 321, 270.17, 270.21

(56) References Cited

U.S. PATENT DOCUMENTS 5,090,009 * 2/1992 Hamada et al. ...................... 369/284
5,536,548 * 7/1996 Koji et al. ............................ 428/64.1
5,633,106 * 5/1997 Aihara et al. .......................... 430/21
5,848,043 * 12/1998 Takada et al. ........................ 369/116

OTHER PUBLICATIONS

Optical Data Storage, "Knight et al. Jul. 1995 vol. 2514," Phthalocyanine CD–R for High Speed Recording, p. 249–257, Yokota et al.
Japanese Journal of Applied Physics, High–Speed Recording Performance of Metal AZO Dye Containing Digital Video Disc–Recordable Disc, Suzuki et al. p. 1669–1674, Nov. 19, 1998.

* cited by examiner

Primary Examiner—Tan Dinh
(74) Attorney, Agent, or Firm—Oblon, Spivak, McClelland, Maier & Neustadt, P.C.

(57) ABSTRACT

An optical recording medium having a recording layer containing an organic colorant as the main component, whereby recording is carried out by changing the reflectivity by irradiation of a laser beam for recording having a wavelength of at most 700 nm, wherein when a light having substantially the same wavelength as the laser beam for recording and having an intensity selected from a range of from 1 to 4.5 mW and a pulse length of about 382 nsec, is irradiated while moving a portion to be irradiated at the medium at a relative velocity of 0.3 m/s to the light, the time required for the reflectivity to change and reach a saturated level, is at most 130% of said pulse length.

14 Claims, 4 Drawing Sheets

$m_1-m_2$ : TOTAL WEIGHT REDUCTION IN THE MAIN WEIGHT REDUCTION PROCESS

INCLINATION OF THE WEIGHT REDUCTION= $(m_1-m_2)/(T_2-T_1)\%/°C$

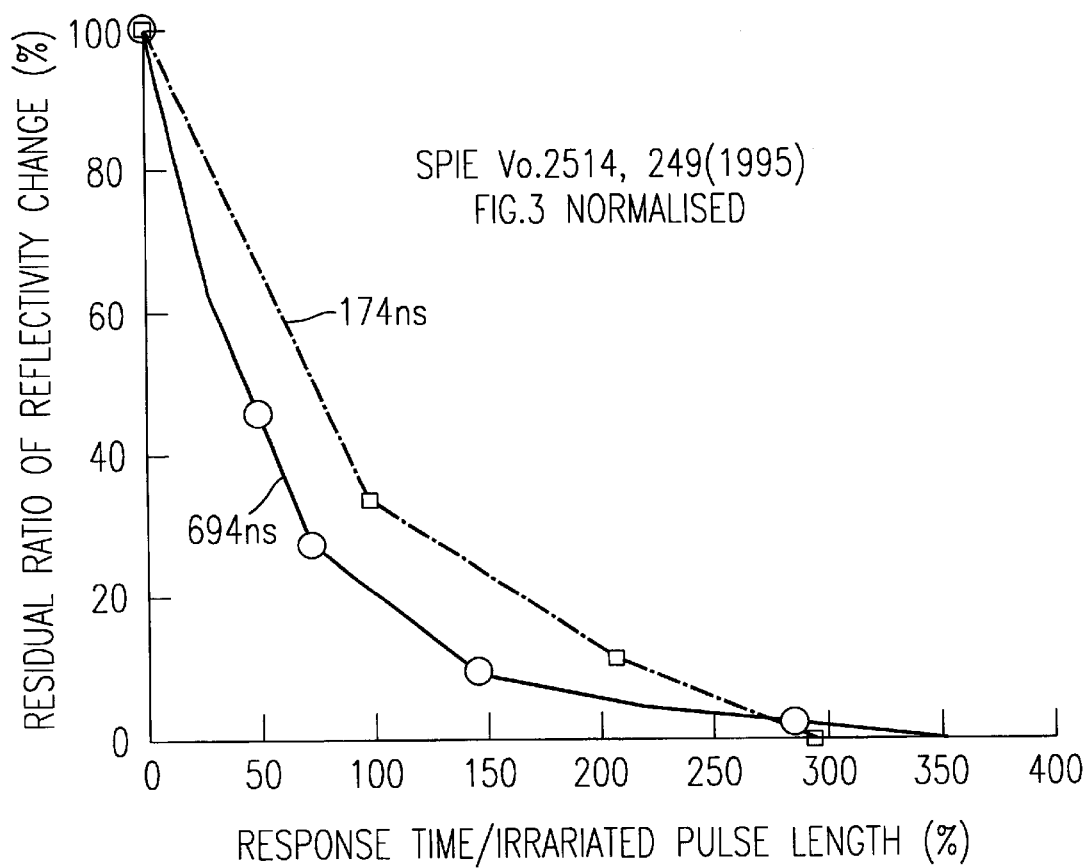

HIGH DENSITY OPTICAL RECORDABLE MEDIUM AND METHOD FOR RECORDING

BACKGROUND OF THE INVENTION

1. Field of the Invention

The present invention relates to an optical recording medium on which information is recordable by a laser beam, and an optical recording method.

2. Discussion of the Background

In recent years, attention has been drawn to shortening of the wavelength of a laser beam to be used for recording/readout, in order to improve the recording density of an optical recording medium.

An optical recording medium has been desired whereby recording and readout can be carried out by a laser beam having a shorter wavelength than the laser beam with a wavelength of 780 nm which is commonly used for CD-R or CD-RW, and DVD-R or DVD-RW has recently been developed whereby recording and readout are carried out by means of a semiconductor laser beam having a wavelength of from 640 to 680 nm.

Further, a laser having a wavelength of at most 600 nm, is now being developed as a technology indispensable for higher densification of an optical recording medium.

There are various types of optical recording media. Among them, an organic colorant type optical recording medium has characteristics such that it is easy to produce and inexpensive. As the colorant to be used for a medium to be recorded and readout by a short wavelength laser as mentioned above among such organic colorant type optical recording media, cyanine or phthalocyanine is, for example, proposed and disclosed in e.g. JP-A-6-336086, JP-A-7-161068, JP-A-7-262604, JP-A-7-125441 and U.S. Pat. No. 5,536,548.

Further, as an optical recording medium whereby recording and readout can be carried out by laser beams having two wavelengths of 780 nm and 640 nm, CD-RII has been developed and is disclosed, for example, in JP-A-7-276804, JP-A-7-156550, U.S. Pat. No. 5,633,106, JP-A-8-111034, JP-A-8-108623, JP-A-8-108624 and JP-A-10-74339.

It is believed that at the recorded region of such an organic colorant type optical recording medium, the optical properties have been changed not only by a change in the optical characteristics and a decrease in the layer thickness resulting from the thermal decomposition of the colorant, but also by a deformation due to softening and stress relaxation of the substrate which takes place subsequently, and a modulation for a record signal is thereby obtained.

Such a recording principle is the same as for CD-R. However, in order to have information recorded in a higher density by means of a laser beam having a shorter wavelength, it is required to form a recorded region which is smaller than the diameter of a beam to be used for recording and readout. To satisfy this requirement, a colorant material is required whereby the edge of a short mark is sharp and an optically large contrast can be obtained.

As an optical recording medium employing such a colorant material, the present applicants have previously proposed an optical recording medium disclosed, for example, in JP-A-9-58123.

For further development of the optical recording media in future, performance for high speed recording will be required in addition to the above-mentioned properties, and a colorant material having a high speed response to a laser beam for recording will be required. However, there have been no substantial proposals for colorant materials excellent in high speed response characteristics.

SPIE vol. 2514, 249 (1995) reports on the results of a study relating to the high speed response characteristics of colorants for CD-R, and it is disclosed that a phthalocyanine type colorant is superior to a cyanine type dye in the high speed response characteristics. Specifically, for example, at pages 254 to 255, a case is disclosed wherein the response speed of a colorant to a laser beam for recording was examined from the change (the inclination of a graph) in the reflectivity when a mark having a usual mark length was recorded on CD-R rotated at a low linear velocity (linear velocity: 0.2 m/s).

Heretofore, it has been believed in general that the response speed to a laser beam for recording, of a recording layer containing an organic colorant, is constant. Namely, it has been believed that the time (hereinafter referred to as the decay time) for the reflectivity to change and reach a saturated level is constant irrespective of the pulse length of irradiated laser beam, so long as a laser beam is irradiated for a sufficient length of time.

However, according to the measurements conducted by the present inventors, it has been found that the decay time changes as the pulse length of irradiated laser beam is changed, and, usually, the decay time prolongs, as the pulse length of irradiated laser beam is prolonged. The mechanism for such a change is not clearly understood, but it is believed that stress relaxation of the resin substrate contributes to the change in reflectivity, and a cause may be such that the critical temperature (such as the glass transition temperature) at which the resin substrate undergoes a deformation, depends on the frequency of the irradiation pulse.

Further, it has been found that the ratio of the decay time to the pulse length of irradiated laser beam, is more important than the decay time itself for the evaluation of the high speed response characteristic. The present invention has been accomplished on the basis of these discoveries.

SUMMARY OF THE INVENTION

Namely, it is an object of the present invention to provide a colorant type optical recording medium which is a high density optical recording medium useful to carry out recording by a laser beam with a wavelength of at most 700 nm and which has a high speed response to a laser beam for recording and is excellent in the performance for high speed recording and to provide an optical recording method.

With the above-mentioned dye disclosed in SPIE vol. 2514, 249 (1995), the ratio of the decay time to the pulse length of irradiated laser beam is lower than the level in the present invention, as shown in Comparative Example 3 given hereinafter. Further, in a conventional optical recording medium (commercially available DVD-R) which has been developed not from such a viewpoint as in the present invention, the ratio of the decay time to the pulse length of irradiated laser beam is also lower than the level in the present invention. The present inventors have found that for high speed recording by a short wavelength laser beam especially when a multi pulse recording system is employed, it is necessary that the ratio of the decay time to the pulse length for irradiated laser beam is not higher than a certain specific level. The present invention has been accomplished on the basis of this discovery.

That is, in the first aspect, the present invention provides an optical recording medium having a recording layer containing an organic colorant as the main component, whereby recording is carried out by changing the reflectivity by irradiation of a laser beam for recording having a wavelength of at most 700 nm, wherein when a light having substantially the same wavelength as the laser beam for recording and having an intensity selected from a range of from 1 to 4.5 mW and a pulse length of about 382 nsec, is irradiated while moving a portion to be irradiated of the medium at a relative velocity of 0.3 m/s to the light, the time required for the reflectivity to change and reach a saturated level, is at most 130% of said pulse length.

Further, in the second aspect, the present invention provides an optical recording medium having a recording layer containing an organic colorant as the main component, whereby recording is carried out by changing the reflectivity by irradiation of a laser beam for recording having a wavelength of at most 700 nm, wherein when a light having a wavelength of about 635 nm and having an intensity selected from a range of from 1 to 4.5 mW and a pulse length of about 382 nsec, is irradiated while moving a portion to be irradiated of the medium at a relative velocity of 0.3 m/s to the light, the time required for the reflectivity to change and reach a saturated level, is at most 130% of said pulse length.

In the third aspect, the present invention provides an optical recording method which comprises irradiating a laser beam having a wavelength of at most 700 nm to such an optical recording medium to change the reflectivity and thereby carry out recording.

BRIEF DESCRIPTION OF THE DRAWINGS

FIG. 5 is a graph wherein data in FIG. 3(A) and FIG. 3(B) of SPIE vol. 2514, 249 (1995) were plotted as normalized by the present invention.

Figure 1:
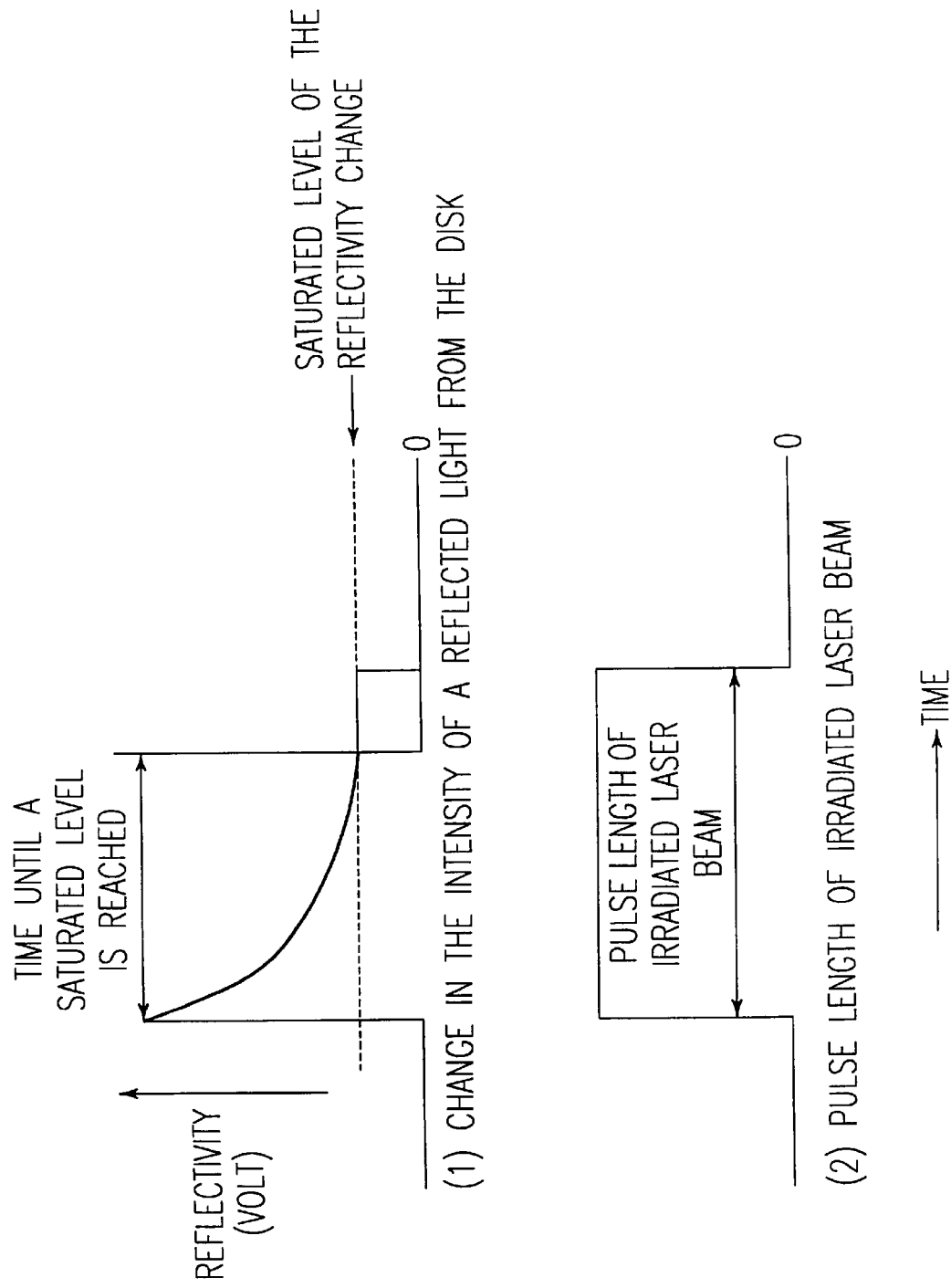
FIG. 1 is a view illustrating the wave form showing an extinction process of reflectivity of the optical recording medium of the present invention and the irradiated pulse length.

In the FIGS., $T_1$ represents the initiation temperature of the main weight reduction process or the first weight reduction process, $T_2$ is the final temperature in the main weight reduction process or the first weight reduction process, $T_3$ is the initiation temperature of the second weight reduction process, $m_1$ is the weight ratio of the colorant at the temperature of $T_1$ to the initial colorant mass $M_0$, $m_2$ is the weight ratio of the colorant at the temperature of $T_2$ to the initial colorant mass $M_0$, and $m_3$ is the weight ratio of the colorant at the temperature of $T_3$ to the initial colorant mass $M_0$.

DETAILED DESCRIPTION OF THE INVENTION

Now, the present invention will be described in detail with reference to the preferred embodiments. In the following description, "the time required for the reflectivity to change and reach a saturated level" will be referred to simply as "the decay time".

In the first aspect of the present invention, a light having substantially the same wavelength as the laser beam for recording, is irradiated, whereby the decay time is measured. By employing a light having substantially the same wavelength as the laser beam for recording for the evaluation of the high speed response characteristic, it is possible to evaluate the accurate high speed response to the laser beam for recording to be used.

Here, the same wavelength as the laser beam for recording is the wavelength recommended as a laser beam for recording for the particular medium. Usually, a commercially available optical recording medium is in accordance with a certain specific product standard determined by e.g. the specification of the particular instrument for recording and is designed so that recording can be carried out suitably by a laser beam with a wavelength prescribed by the standard.

Namely, the wavelength of a laser beam for recording, for an individual optical recording medium is substantially determined depending upon the applicable product standard. For example, for DVD-R having a capacity of 3.95 GB, the wavelength of a laser beam for recording is prescribed to be within a range of 635±5 nm by the product standard.

In general, semiconductor lasers used as light sources of laser beams for recording, respectively have individual differences, and the wavelengths of semiconductor lasers have temperature dependency. Accordingly, the wavelengths usually have fluctuations of a level of ±5 nm. Thus, in each product standard, the wavelength of a laser beam for recording is usually prescribed to have a certain range.

Accordingly, in the case of DVD-R having a capacity of 3.5 GB, substantially the same wavelength as the laser beam for recording is within a range of 635±5 nm.

In the second aspect of the present invention, a light having a wavelength of about 635 nm is irradiated, whereby the decay time is measured. By employing a light having a wavelength of about 635 nm for the measurement, it is possible to easily evaluate the high speed response of the medium when recording is carried out by a laser beam for recording having a wavelength of at most 700 nm.

The wavelength of about 635 nm is a value having a range of 635±5 nm, since the wavelength of a laser beam has fluctuations, as mentioned above.

For the pulse length of irradiated laser beam for the measurement of the decay time, one point may be selected usually within a range of from 150 to 400 nsec, preferably from 300 to 400 nsec. However, for the purpose of the present invention, it is fixed to be about 382 nsec.

About 382 nsec is meant for a value having a range of 382±10 nsec. The pulse length fluctuates more or less depending upon e.g. the specifications of the signal transmitter or drive, or the rising time or dropping time of the semiconductor laser. Further, a measuring error is also taken into consideration in letting the pulse length have such a range.

Further, by the term "a light is irradiated while moving a portion to be irradiated of the medium at a relative velocity of 0.3 m/s to the light", it is meant, for example, that while rotating an optical disk at a linear velocity of 0.3 m/s, a light from an optical head is irradiated to a portion of the optical disk.

Now, practical embodiments of the present invention will be described.

The recording layer for the optical recording medium of the present invention contains an organic colorant as the main component.

Upon absorption of a laser beam for recording having a wavelength of at most 700 nm, the recording layer undergoes a temperature rise, a weight reduction, reduction of the layer thickness and a change of the optical properties. Such a changed portion constitutes a recorded portion.

If a readout laser beam is irradiated to the portion where the optical properties have been changed, the phase of returning light of the readout laser beam changes, whereby the reflectivity differs from the non-recorded portion. Readout is carried out by detecting the portion where the reflectivity has been changed.

The organic colorant to be used for the recording layer, is not particularly limited with respect to the structure, but it is required to have a sufficiently high speed response (pulse response) to a laser beam for recording, as a colorant for high speed recording.

In the method for measuring the decay time in the present invention, the relative velocity of the portion of the medium to be irradiated to the irradiating light is set to be at an ultralow level of 0.3 m/s, whereby while the position to be irradiated by a laser beam for recording, is maintained substantially at the same position, a light having a wavelength of about 635 nm and having a sufficient intensity for recording, is irradiated thereto, and the time required for the reflectivity to change and reach a saturated level, is measured.

This measuring method is in accordance with a method which is commonly known as "a recording method for evaluation of static characteristics". For the optical recording medium of the present invention, it is an essential requirement that the decay time in a case where a light having a pulse length of about 382 nsec is irradiated, is at most 130% of the pulse length. When the ratio of the decay time to the pulse length is at most the specific value of the present invention, the optical recording medium will have an excellent high speed response characteristic. The corresponding ratios in the prior art used to be all as high as, for example, from 150 to 200%.

If the decay time exceeds 130% of the pulse length of irradiated light, even if accurate recording can be made at a low speed, sharpness of the edge of a short mark will be lost at the time of high speed recording, and the difference in sensitivity depending upon the mark length tends to be large, whereby the jitter will increase. Further, no adequate modulation amplitude tends to be obtained during high speed recording, whereby the C/N value will decrease substantially as compared with the low speed recording, whereby the jitter value deteriorates again.

Preferably, the time for the reflectivity to change and reach a saturated level, is at most 100%, more preferably at most 70%, of said pulse length.

The intensity of the laser beam for recording is influential over the saturated level of the reflectivity, but is not substantially influential over the decay time itself. Accordingly, it may be at a level sufficient for recording. In the present invention, the intensity is set to be one selected from a range of from 1 to 4.5 mW. If it is smaller than 1 mW, recording can not sometimes be carried out. On the other hand, if it exceeds 4.5 mW, the recording layer may sometimes be destroyed when irradiation is carried out at an ultralow speed of a level of 0.3 m/s.

Now, an example of the measuring method will be described with reference to so-called DVD-R.

With DVD-R, the usual recording linear velocity (1-fold velocity) is from 3.5 to 3.8 m/s. The reference clock period T for a recorded mark length is 38.2 nsec. Accordingly, 5T pulse corresponds substantially to 191 nsec, and 10T pulse corresponds substantially to 382 nsec.

Firstly, by means of a recording laser evaluation machine, a disk is rotated at a rotational speed corresponding to a linear velocity of 0.3 m/s, while setting the pulse length of irradiated laser beam to be 10T pulse (about 382 nsec) without multi pulses. A laser beam is irradiated to the rotating disk, whereby the change in reflectivity of the disk is taken into a storage oscilloscope (band width: up to 500 MHz). The recording power is usually set to be at one point within a range of from 1 to 4.5 mW.

The waveform of the change in reflectivity thereby obtained is, for example, as shown by (1) in FIG. 1. From this waveform, the time (the decay time) for the reflectivity to reach a saturated level from the initiation of irradiation of the laser beam, is obtained, when a level where the reflectivity becomes constant, is taken as the saturated level. This decay time is compared with the time corresponding to the pulse length of irradiated laser beam, as shown by (2) in FIG. 1.

This disk is subjected to recording and then to readout at a speed of 1-fold velocity (3.5 to 3.8 m/s), 2-fold velocity (5 to 10 m/s) or 4-fold velocity (10–20 m/s), whereby the linear velocity dependency of the recording characteristics can be evaluated by measuring the jitter and signal quality.

The optical recording medium of the present invention comprises, for example, a substrate, a recording layer containing an organic colorant as the main component, a reflective layer and a protective layer. When recording/readout is carried out through the substrate, a transparent substrate is employed. As such a transparent substrate, one made of a resin such as polycarbonate, polymethacrylate or amorphous polyolefin, one made of glass or one having a resin layer made of radiation curable resin, i.e. photopolymerizable resin, formed on glass, may, for example, be employed. Preferably, the optical recording medium has a resin substrate or a resin layer, in contact with the recording layer. For example, by using a resin substrate or a substrate having a radiation-curable resin layer formed on glass, a recording layer may be formed in contact with the substrate, or a resin layer may be formed between the recording layer and the substrate. At the time of recording, in addition to the change in reflectivity due to weight reduction or discoloration of the recording layer, a change in reflectivity due to a deformation of such a resin layer can be utilized, whereby a larger change in reflectivity can be obtained, and the modulation amplitude can be increased.

In a case where the recording layer is formed directly on glass, it is considered that although the modulation amplitude may be sacrificed more or less, the decay time is shortened, whereby the high speed response characteristic will be substantially increased.

Further, the optical recording medium may have a guide groove for a recording/readout laser beam on the substrate or the above resin layer.

In such a case, the groove width is preferably from 0.2 μm to 0.4 μm. In order to obtain an adequate tracking error signal amplitude and to increase the transfer rate of the groove to the substrate at the time of molding, the groove width is preferably at least 0.2 μm. On the other hand, if the groove width is too wide, the recording/readout laser beam spot will be fully contained in the groove, whereby the reflectivity will be low, and the recording modulation amplitude will be low. Accordingly, the groove width is preferably at most 0.4 μm. Further, if the groove is wide, the space for the resin to flow at the time of the thermal deformation of the substrate, is correspondingly wide, whereby cave-in or depression of the substrate at the recorded portion caused by the heat accumulation will be substantial, thus leading to a distortion of the recording/readout signal. From the viewpoint of the signal quality, the groove width is more preferably from 0.25 to 0.32 μm. Here, the groove width is a groove width at a position corresponding to a half of the groove depth, i.e. a half value width.

Further, it is considered that the narrower the groove width, the longer the decay time, the high speed response tends to be.

The groove depth is preferably from 100 to 180 nm. In order to obtain an adequate recording modulation by creating an adequate change at the time of recording, the groove depth is preferably at least 100 nm. On the other hand, in order to increase the transferability of the groove shape to the substrate at the time of molding and to secure good flatness, the groove depth is preferably at most 180 nm.

With respect to the shape of the groove, a U-shape groove is preferred. The U-shape groove is one wherein the bottom of the groove is flat and the cross-sectional shape is a U-shape.

The track pitch is preferably from 0.7 to 1.0 μm in order to attain a high capacity while maintaining an adequate signal quality.

The shape of the groove can be obtained by an optical measurement by means of a He-Cd laser beam in a case where the track pitch is at least 1 μm and by measuring the profile by means of STM or AFM in a case where the track pitch is narrower than 1 μm.

The organic colorant to be used for the recording layer is not particularly limited, so long as it satisfies the high speed response characteristic required for the optical recording medium of the present invention. It may, for example, be a phthalocyanine dye, a cyanine dye, a metal-containing azo dye, a dibenzofuranone dye or a metal-containing indoaniline dye.

The recording layer may be composed substantially solely of the organic colorant, but it may contain various additives within a range not to impair the performance of the optical recording medium of the present invention.

When the optical recording medium is an optical disk, the recording layer is obtained usually by spin coating a coating fluid having an organic colorant, etc. dissolved in a solvent, on a disk substrate.

As such a solvent, ethanol, 3-hydroxy-3-methyl-2-butanone, diacetone alcohol or a fluorinated alcohol may, for example, be employed. Among them, a fluorinated alcohol having at least 3 carbon atoms, which is a solvent having a boiling point of from 100 to 150° C., such as 1H,1H,3H-tetrafluoropropanol, 1H,1H,5H-octafluoropentanol or 1H,1H,3H-hexafluorobutanol, is, for example, preferably employed.

If the boiling point is too low, the solvent is likely to be evaporated quickly during spin coating, whereby the coating fluid may not reach the outer periphery side of the disk substrate, for example, the outer periphery side further than a radius of 40 mm, whereby the layer thickness distribution in the radial direction will be very large, and good characteristics may not be obtained. Therefore, the boiling point is preferably at least 100° C.

On the other hand, if the boiling point is too high, it takes time for evaporation, and the solvent is likely to remain in the layer, whereby good recording jitter may not sometimes be obtained. Accordingly, the boiling point is preferably at most 150° C.

In order to secure a large recording modulation amplitude, the thickness of the recording layer at the land and groove portions is made to be thick to some extent. On the other hand, in order to suppress the jitter or crosstalk by preventing the recorded mark from spreading in the track direction or in the land direction, the thickness of the recording layer at the land and groove portions is preferably made to be thin to some extent. Accordingly, the thickness of the recording layer is preferably from 30 to 100 nm at the land portion and from 80 to 180 nm at the groove portion.

The groove depth on the recording layer is preferably from 50 to 80% of the groove depth of the substrate. In order to secure adequate reflectivity and an adequately large tracking error signal, it is preferably at least 50%, and in order to secure an adequately large recording modulation amplitude, it is preferably at most 80%.

With respect to the refractive index n and the extinction coefficient k at a recording/readout laser beam wavelength ±5 nm, of the recording layer, the refractive index n is preferably from 2.0 to 3.0, more preferably from 2.3 to 2.6, and the extinction coefficient k is preferably at least 0.03, more preferably within a range of from 0.03 to 0.10 in a case of a high speed recording specification where the present invention is particularly effective.

In this case, the measurement of n and k of the recording layer can be carried out by the following method.

On a mirror surface replica, a coating fluid having an organic colorant, etc. dissolved in a solvent is placed to cover about a half region of the disk surface, and a recording layer is formed by spin coating. Then, on a part of this recoding layer, a reflective layer is formed by sputtering, whereupon the stepped height of the reflective layer from the non-coated portion is measured by a three dimensional surface roughness meter (ZYGO: Maxim 5800, manufactured by Canon) to obtain the layer thickness. Then, with respect to the recording layer having no reflective layer, multiple incident angle measurements are carried out by an automatic wavelength scanning ellipsometer (MEL-30S Model) manufactured by Nippon Bunko, and then, with reference to the above-mentioned layer thickness, n and k presenting a good fitting for the ellipsometer's data, are determined, and they are taken as the desired optical constants n and k.

As a colorant to be used for the optical recording medium of the present invention, which satisfies the high speed response characteristic, preferred is a colorant which has both a high absorbance and a high refractive index. Selection of the colorant is most important to satisfy the ratio of the decay time to the pulse length of irradiated laser beam according to the present invention. However, in addition, adjustment can be made by properly selecting conditions such as the layer thickness and the groove width.

As a colorant useful for the invention, preferred is, for example, one having a substituent which is capable of giving a strain to the flatness of the π electron type structural portion in the colorant structure (which has a high steric hindrance) or a saturated cyclic substituent such as a cyclohexyl group, a cyclopropenyl group or a pyrrolidyl group, or one having a saturated ring such as cyclohexane or piperidine condensed to an aromatic ring in the colorant structure. Such a group or structure is considered to be readily decomposable as it increases instability of the excited state of the colorant.

As the basic structure of the colorant, a cyanine type, phthalocyanine type or metal-containing azo type dye is, for example, preferred. Particularly preferred is a metal-containing azo type dye from the viewpoint of the light resistance and good absorbance mode of the layer.

The most preferred among such metal-containing azo dyes may, for example, be a metal chelate dye of a compound of the following formula (1), (2), (I) or (II) with a metal.

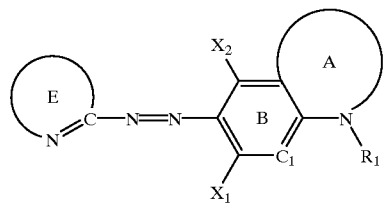

(1)

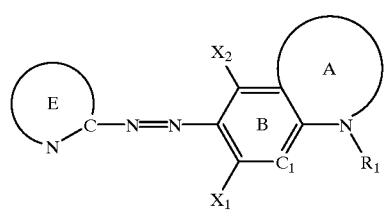

(2)

wherein ring E is a hetero ring formed together with the carbon atom and the nitrogen atom bonded thereto, ring A is a 5- to 8-member ring, ring B is a benzene ring which may be substituted, $C_1$ is a carbon atom, $R_1$ is a hydrogen atom, a linear or branched alkyl group which may be substituted, or it forms, as bonded to the carbon atom of $C_1$, a ring, and at least one of $X_1$ and $X_2$ is a $NHSO_2Y$ group, wherein Y is a linear or branched alkyl group substituted by at least two fluorine atoms.

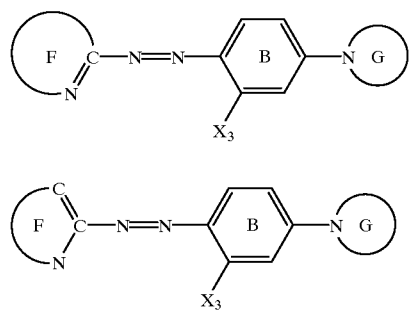

(I)

(II)

wherein ring F is a hetero ring formed together with the carbon atom and the nitrogen atom bonded thereto, ring B is the same as defined in the above formulae (1) and (2), ring G is a hetero ring formed together with the nitrogen atom bonded thereto, and $X_3$ is $—NHSO_2Y$ wherein Y is the same as defined in the above formulae (1) and (2).

Specifically, dyes of the following formulae may, for example, be mentioned.

TABLE 1

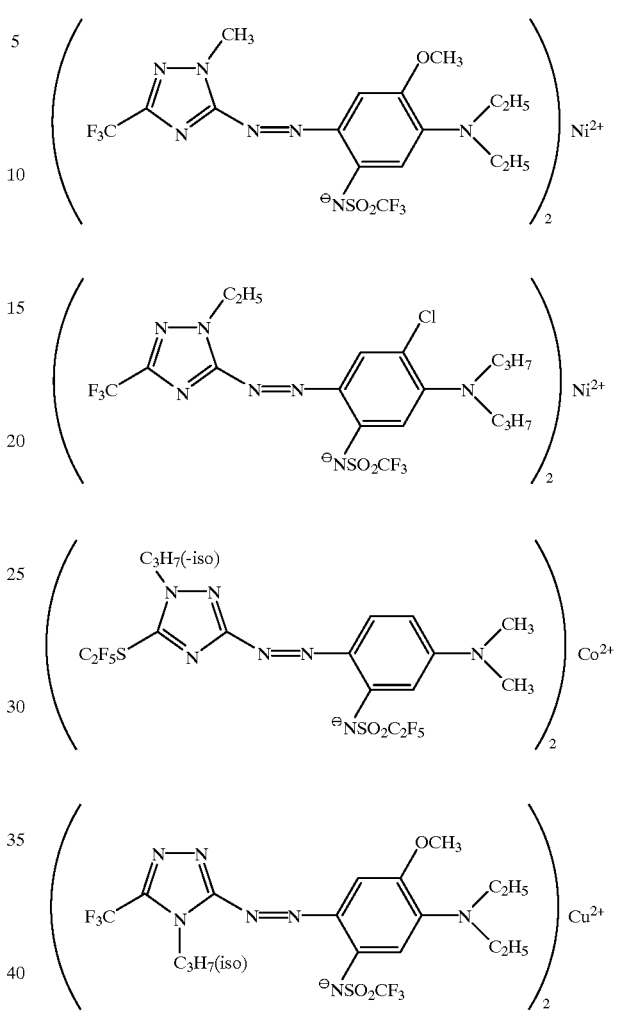

TABLE 2

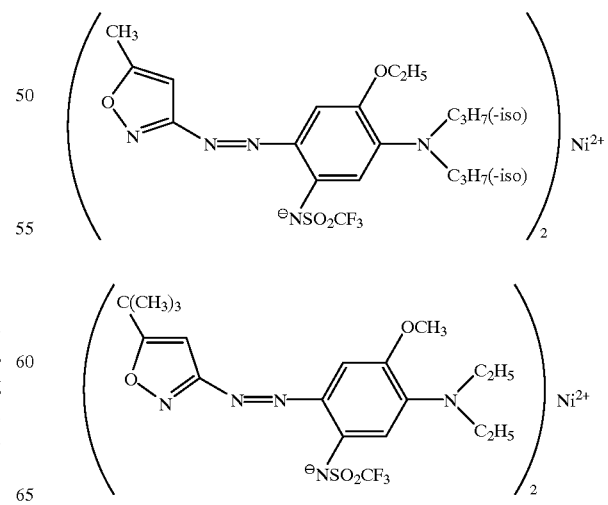

TABLE 2-continued
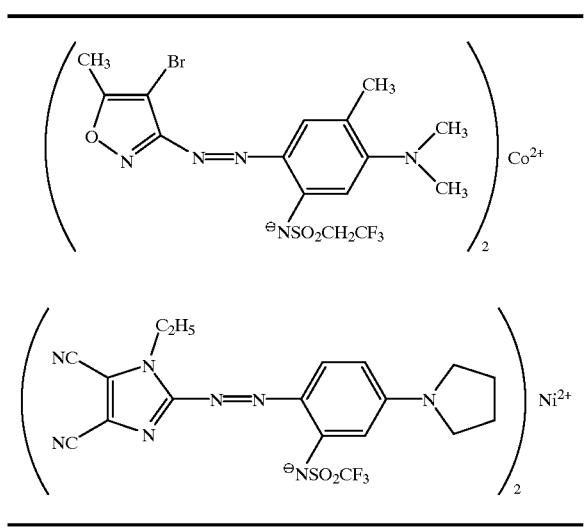
TABLE 3
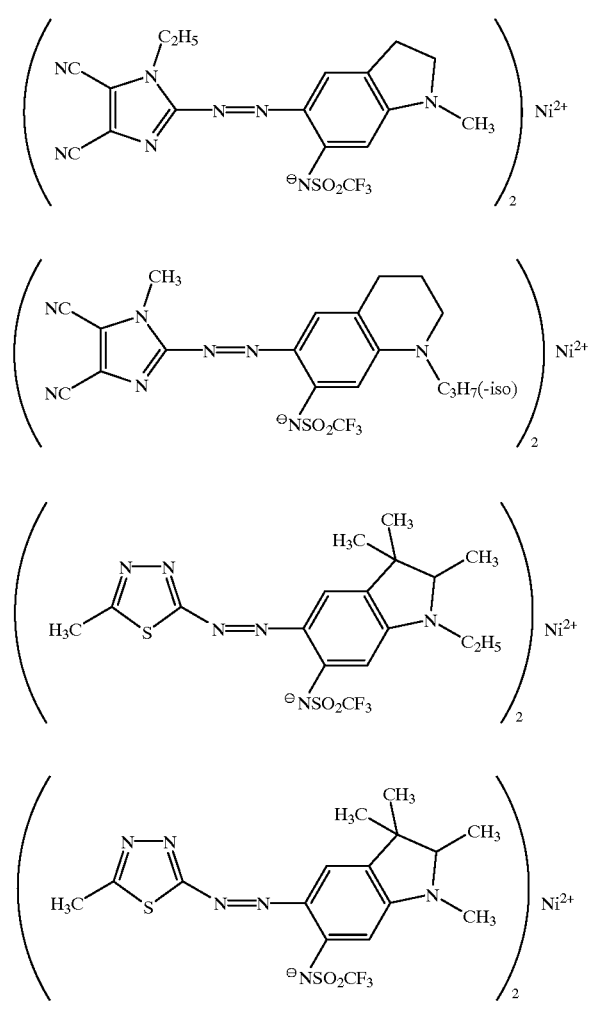
TABLE 4
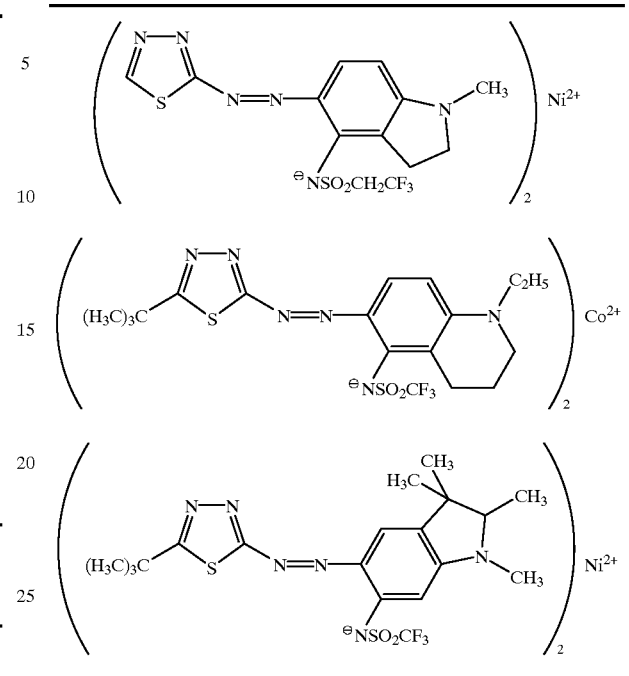
TABLE 5
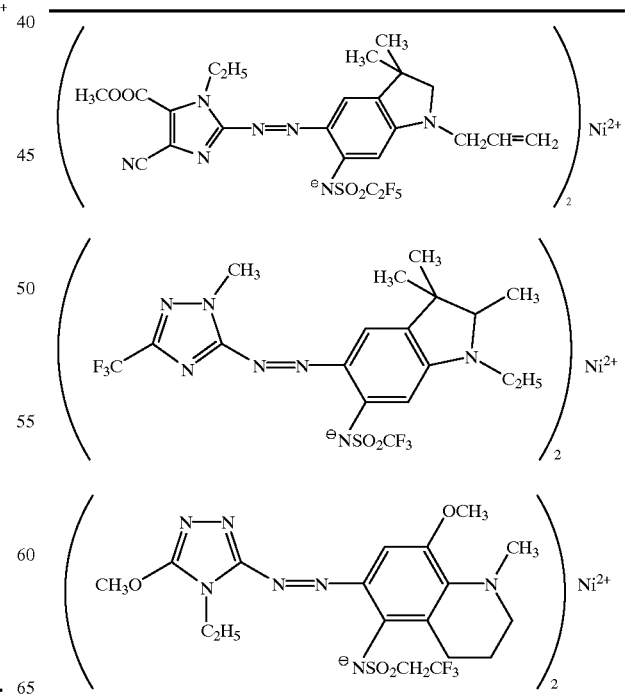

TABLE 5-continued

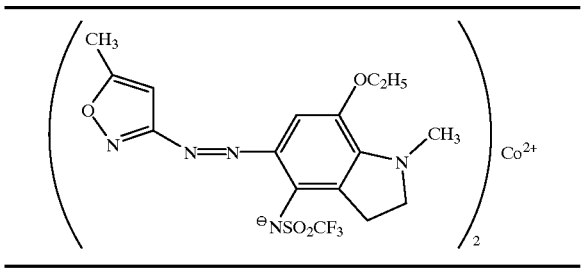

TABLE 6

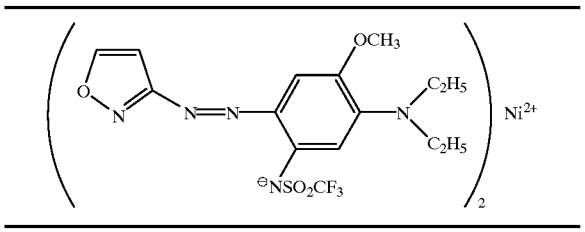

The thermal characteristic of the organic colorant constituting the recording layer also relates to some extent to the length of the decay time in the present invention. For example, in order to obtain adequate characteristics for a short wavelength application, the weight reduction in the main weight reduction process in the thermogravimetric analysis is preferably sharp against the temperature.

In the present invention, "the main weight reduction process" is meant for a process wherein at least 15% of the initial mass of the colorant undergoes a linear weight reduction, among several weight reduction processes. When there are two or more such processes, it is meant for the process in which the inclination of the weight reduction is largest.

Further, "the total weight reduction" means the weight reduction in "the main weight reduction process".

Figure 2:
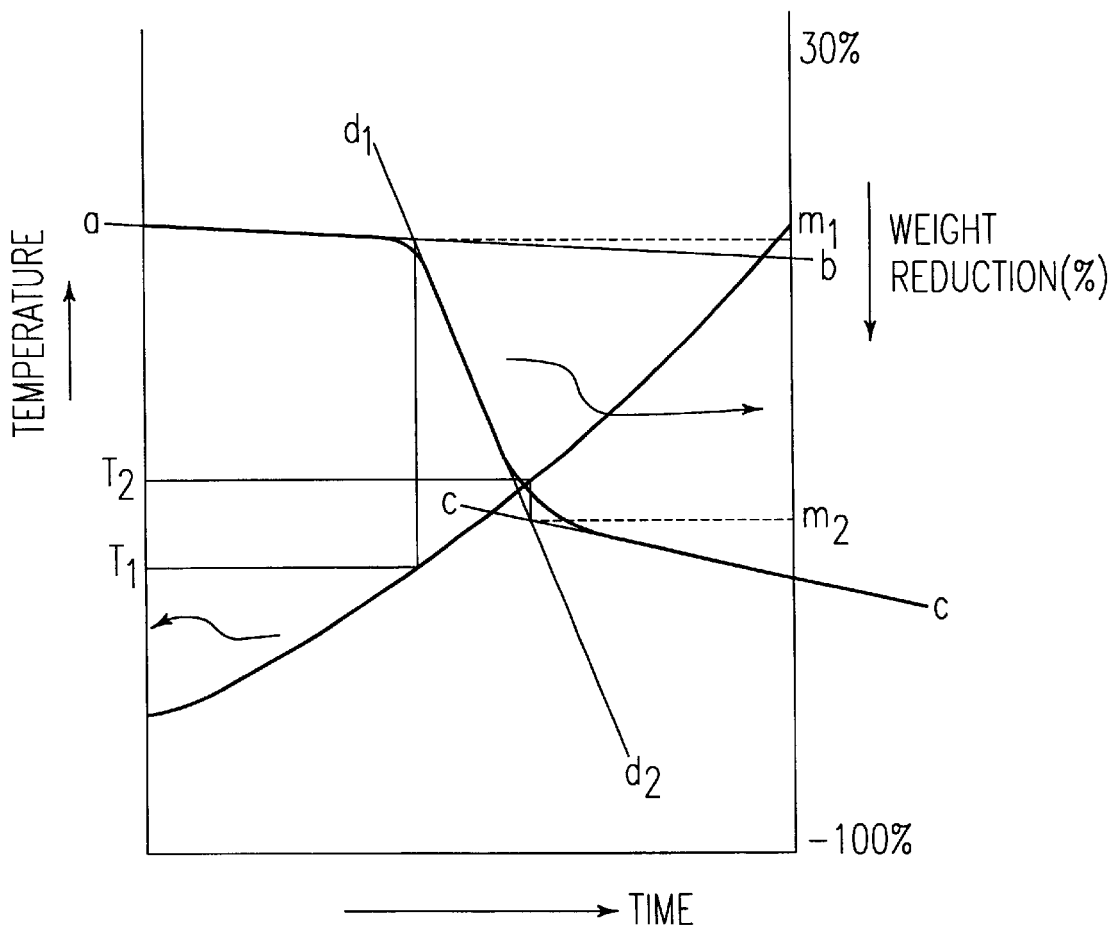
FIG. 2 is a differential thermobalance chart illustrating an example showing the main weight reduction process of an organic colorant, the total weight reduction in the main weight reduction process and the inclination of the weight reduction, in a thermogravimetric analysis in nitrogen.

Now, the inclination of the weight reduction will be described with reference to FIGS. 2 and 3.

An organic colorant having a mass $M_0$ is heated in nitrogen at a temperature-rising rate of 10° C./min. As the temperature rises, the mass decreases initially gradually in a very small amount to draw substantially a linear weight reduction line a-b and then abruptly starts to decrease substantially so that a weight corresponding to at least 15% is decreased substantially along linear line $d_1$-$d_2$. In FIG. 2, this is the main weight reduction process, and the main weight reduction initiation temperature is a temperature $T_1$ at the crossing point of linear line $d_1$-$d_2$ and linear line a-b. Further, at that time, the weight ratio of the colorant to the mass $M_0$ is $m_1$. Thereafter, the weight reduction settles in the weight reduction process shown by the substantially linear line c-c. When the temperature at the crossing point of linear line $d_1$-$d_2$ and linear line c-c is $T_2$, and the weight ratio of the colorant is $m_2$, the inclination of the weight reduction here is a value represented by the following formula:

$$(m_1-m_2) (\%)/(T_2-T_1) (° C.)$$

and the weight reduction % (total weight reduction %) to the initial mass $M_0$ of the colorant is a value represented by the following formula:

$$(m_1-m_2) (\%)$$

Figure 3:
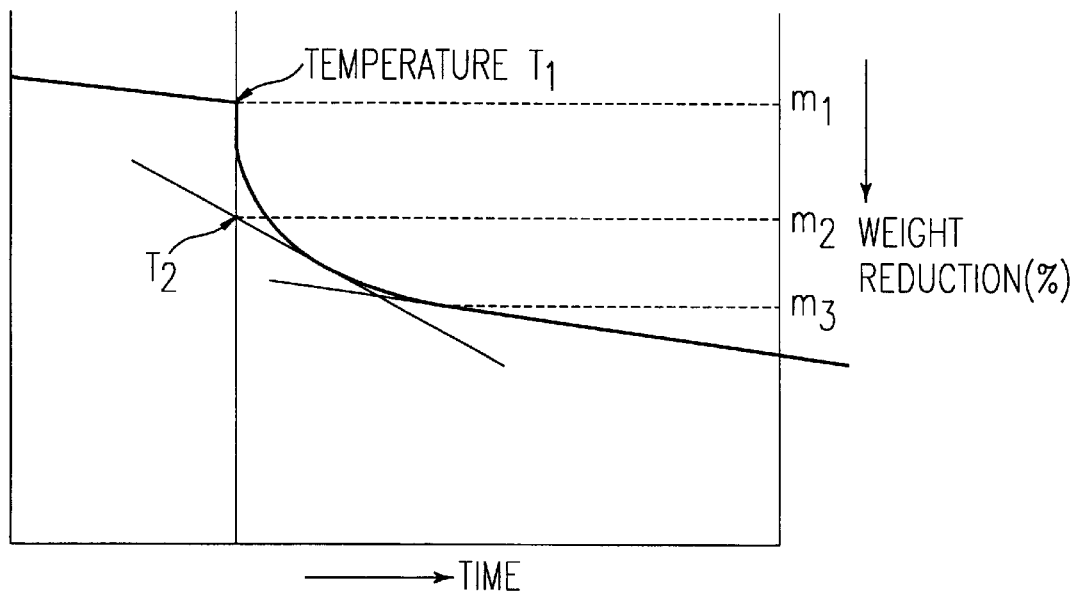
FIG. 3 is a differential thermobalance chart illustrating another example showing the main weight reduction process of an organic colorant, the total weight reduction in the main weight reduction process and the inclination of the weight reduction, in a thermogravimetric analysis in nitrogen.

Further, in the case of a weight reduction curve as shown in FIG. 3, the inclination of the weight reduction in the main weight reduction process is a value represented by the following formula:

$$(m_1-m_2) (\%)/(T_2-T_1) (° C.)$$

and the total weight reduction (%) is a value represented by the following formula:

$$(m_1-m_2) (\%)$$

At the time of recording, by the reaction in the main weight reduction process, the organic colorant will be decomposed, the thickness of the recording layer will be reduced, and the optical characteristics will be changed, whereby marks (recorded portions) in an optical sense, will be formed. In many cases, the resin layer or the substrate beneath the recording marks will deform by the temperature rise due to heat absorption by the colorant layer at the time of recording, and the groove width will expand.

The colorant layer as the recording layer absorbs light to form marks. Accordingly, when the main weight reduction is abrupt against the temperature i.e. when the weight reduction takes place within a narrow temperature range, the optical change of the recording layer and the change in the layer thickness will take place only within a narrow region. Accordingly, in the case of a high density mark length recording, marks tend to scarcely overlap one another, whereby crosstalk or jitter will be little and the resolution of marks will be improved, such being very advantageous. Therefore, it is preferred to employ a colorant which undergoes a sharp weight reduction against the temperature.

As a colorant to be used in the present invention, in the thermogravimetric analysis in nitrogen, the inclination of the weight reduction in the main weight reduction process is preferably at least 2%/° C., and the total weight reduction % in the process is at least 30%, and more preferably, the inclination of the weight reduction is at least 30%/° C., and the total weight reduction % is at least 50%.

When the inclination of the weight reduction is at least 2%/° C., recorded portions which are sufficiently small and slender without spreading in the land direction, can easily be formed, and reduction of jitter and the resolution of marks will be improved, and it will be easy to carry out short mark length recording suitable for a high density recording. Further, when the total weight reduction % is at least 30%, it will be easy to obtain a sufficient contrast in reflectivity as between before and after the recording, and the recording modulation amplitude will be large, whereby adequate short mark characteristics can easily be obtained.

Figure 4:
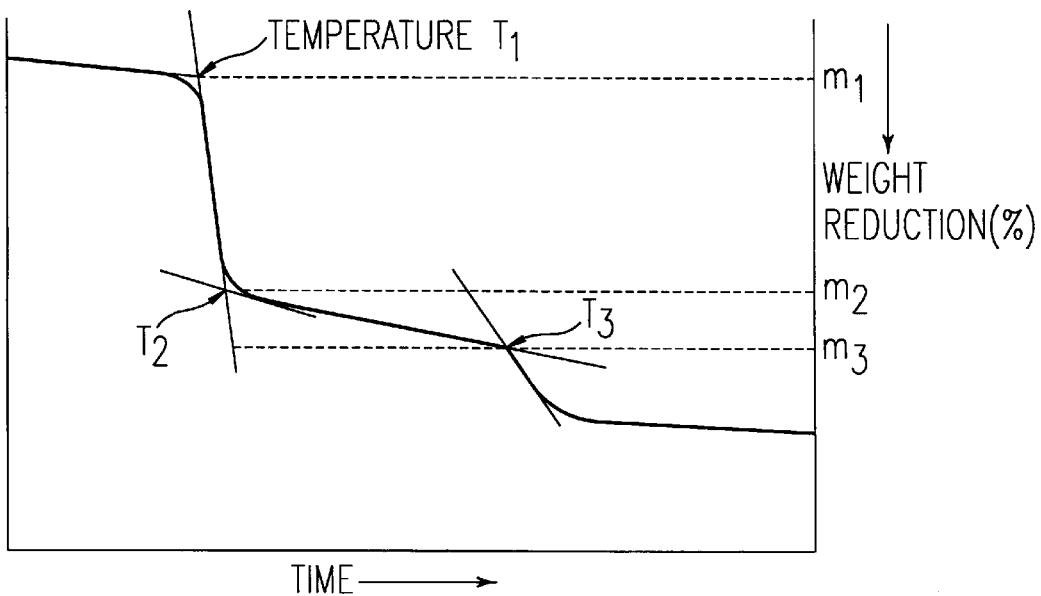
FIG. 4 is a differential thermobalance chart illustrating an example showing the main weight reduction process of an organic colorant, the total weight reduction in the main weight reduction process and the inclination of the weight reduction, in a thermogravimetric analysis in atmospheric air.

Further, preferred is a colorant whereby the thermal decomposition behavior (TG-DTA characteristics) during the temperature rise at a rate of 10° C./min in the atmospheric air is not very different from that during the temperature rise at 10° C./min in nitrogen. With any colorant, the main weight reduction process as observed in the measurement in nitrogen exists without any substantial change in the atmospheric air. However, in a case of a certain type of a colorant, only in the measurement in the atmospheric air, a second weight reduction process is present which accompanies heat generation at a higher temperature side than the main weight reduction process, and through such a process, the total weight reduction will reach substantially 100% (see FIG. 4).

In the case of a medium having a protective layer laminated or a laminated medium, the reaction which takes place in this second weight reduction process may sometimes be influential over the recording characteristics when an extremely large recording power is employed. Further, in a case where the protective layer on the reflective layer is thin or in a case where no layer is laminated on the reflective layer, the temperature tends to be very high at the interface of the colorant and the resin layer or the substrate even with a usual recording power, and by a reaction with oxygen supplied through the reflective layer, oxygen in the substrate or a very small amount of oxygen formed in the main weight reduction process of the colorant, the same reaction as in the second weight reduction process takes place, whereby the shape of marks tends to be irregular, and the signal characteristics may tend to be poor.

In the case of a colorant having such two step weight reduction processes in the thermogravimetric analysis in the atmospheric air, it is preferred that the weight reduction in the first weight reduction process is at least 60%, or the initiation temperature in the second weight reduction process which takes place at a higher temperature side than the first weight reduction process, is at least 500° C., because in the case of high speed recording, the maximum temperature of the recording layer will be from 400 to 500° C., and due to the influence of oxygen of the substrate generated from the substrate interface, the interior of the recording layer will be in a state close to the state during the thermogravimetric analysis in the atmospheric air. Accordingly, when a colorant which undergoes the second weight reduction process at a temperature lower than 500° C. in the atmospheric air, is used for the recording layer, by the high speed recording, the weight reduction process of the colorant will consequently be of two steps, whereby the deformation of the recorded portion tends to be excessive, and jitter tends to deteriorate.

The inclination of the weight reduction in the present invention is measured while heating the colorant at a temperature-rising rate of 10° C./min. Accordingly, for example, an inclination of the weight reduction being 13%/° C. may be represented by a weight reduction rate of 130%/min.

The reflective layer in the optical recording medium of the present invention is preferably made of a metal such as Ag, Al or Au which efficiently reflects a laser beam passed through the recording layer. So that the reflectivity will not decrease at a recording/readout wavelength (preferably from 500 to 700 nm), it is preferred that the reflective layer has a refractive index of from 0.1 to 1.5 and an extension coefficient k of from 3 to 8, with a light within a wavelength range of the recording/readout wavelength ±5 nm. Especially when the refractive index is from 0.1 to 0.2, and the extinction coefficient is from 3 to 5, high reflectivity can be obtained. However, in a case where higher speed recording is intended, the reflectivity and the thermal conductivity of the reflective layer may also be involved. Ag and an Ag alloy are most preferred, since their reflectivity and thermal conductivity at a short wavelength are large.

Further, at the time of sputtering the reflective layer, it is necessary to lower the amount of oxygen at the interface as far as possible, because as mentioned above, there are many colorants, of which the thermal decomposition behaviors change substantially by the presence of oxygen.

In the optical recording medium of the present invention, a protective layer is preferably laminated on the reflective layer to prevent formation of holes in the reflective layer at the recorded portion or to suppress asymmetry of deformation. As the material for the protective layer, a resin curable with radiation rays such as ultraviolet rays, is preferred. Further, the thickness of the protective layer is usually at least 1 µm, preferably at least 3 µm, to prevent curing suppression by oxygen. Further, a hot melt or an adhesive curable with radiation rays such as ultraviolet rays, may be formed thereon in a thickness of from 10 to 20 µm, and another optical recording medium or a simple substrate may be bonded thereto.

In the optical recording method of the present invention, recording is carried out by irradiating a laser beam having a wavelength of at most 700 nm to the above-described recording medium to change the reflectivity, whereby high density and high speed recording can be made on the optical recording medium. More preferably, the wavelength is from 500 to 700 nm.

Now, the present invention will be described in further detail with reference to Examples. However, it should be understood that the present invention is by no means restricted to such specific Examples.

In these Examples, evaluation of disks was made as follows. A disk was mounted on an evaluation machine (DDU-1000, manufactured by Pulse Tech Co.) having an optical head with a wavelength of 640 nm and a numerical aperture of object lens NA=0.6 and rotated at a linear speed of 0.3 m/s. To this disk, a laser having a pulse length of 383 nsec was irradiated to carry out recording.

Here, 383 nsec corresponds substantially to 10T pulse (reference clock period T: 38.2 nsec) at a usual linear velocity for recording (3.5 to 3.8 m/s) for so-called DVD-R.

Several methods are available for measuring the pulse length of irradiated laser beam. The most accurate is a method wherein the emitted laser beam is taken into a power meter for high speed pulses and is directly measured. However, the simpler method is such that the pulse width of a signal entering into a laser driving system, is measured by a time interval analyzer, and the build up time and dropping time of the laser beam are added to the measured value, to obtain a value which is substantially close to the value of the pulse width of irradiated laser beam. Further, as a simpler method, a value close to the pulse length of irradiated laser beam actually measured, may be obtained by measuring the portion close to the bottom side of the trapezoid defined by the build up and dropping of the signal wave-form. In the Examples, an average value of the results of all such measurements was taken as the pulse length of irradiated laser beam.

At the same time, the reflected beam of the disk was detected and taken into a storage oscilloscope (9354X, manufactured by LeCroy Co.) of a 500 MHz zone, whereby the decay time of reflectivity was measured.

Here, the measurement of the reflectivity was carried out on the groove after passing through a polarized beam splitter.

Then, a single frequency signal (=tone pattern) of a duty ratio of 25% was recorded at a linear velocity of 3.5 m/s, 7 m/s or 14 m/s to obtain a mark length corresponding to the shortest mark length of 0.44 µm and was reproduced at a linear velocity of 3.5 m/s, whereby saturated C/N (hereinafter referred to simply as C/N) at a band width of 30 kHz was measured. In the following Examples and Comparative Examples, 1-fold velocity means 3.5 m/s, 2-fold velocity means 7 m/s, and 4-fold velocity means 14 m/s.

The results of evaluation in the respective Examples and Comparative Examples are summarized in Table 7.

EXAMPLE 1

On a polycarbonate substrate having a thickness of 0.6 mm and having a U-shape groove with a groove depth of 150 nm, a groove width of 0.28 µm and a track pitch of 0.80

μm (as measured by AFM), 0.042 g of a metal-containing azo dye of the following formula:

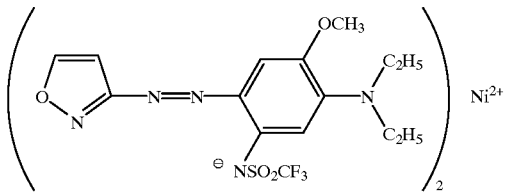

dissolved in 4 g of octafluoropentanol (OFP), was spin-coated at a rotational speed of 1,200 rpm, followed by annealing in an oven of 80° C. for 3 hours, to form a recording layer.

In nitrogen, the main weight reduction initiation temperature of this dye was 246° C., the weight reduction rate was 422%/min, the inclination of the weight reduction was 42%/° C., and the total weight reduction in this process was 56%. On the other hand, in the atmospheric air, the weight reduction % in the first weight reduction process was 71%. The thermogravimetric analysis was carried out by means of a differential thermal analyzer ("TG-DTA-320" of "SSC5200H" series) manufactured by Seiko Instruments & Electronics, Ltd.

The refractive index n and the extinction coefficient k at 640 nm of a single layer of this dye were 2.43 and 0.07, respectively, and the maximum absorption was at 592.5 nm.

On this recording layer, silver was sputtered in a thickness of 100 nm, and the groove depth on the recording layer in that state was measured by AFM and was found to be 65% of the groove depth of the substrate. Further, the thickness of the recording layer at the land portion was 30 nm (accordingly, the thickness at the groove portion was 85 nm). On this reflective layer, a UV curable resin ("SD-318", manufactured by Dainippon Ink K.K.) was spin-coated and cured by an ultraviolet ray lamp, to form a protective layer having a thickness of about 3 μm.

Here, n and k at 640 nm of the reflective layer used in this disk were 0.08 and 4.28, respectively.

Two disks prepared in the same manner as described above, were bonded by a hot melt adhesive, and the bonded disk was evaluated.

As a result, the time (the decay time) required for the reflectivity to change and reach a saturated level with a recording power of 1.6 mW, was 160 nsec and 42% of the pulse length, thus showing excellent response characteristics.

Further, C/N in a case where single frequency recording was carried out, was 58 dB, 55 dB or 54 dB at a linear velocity of 3.5 m/s, 7 m/s and 14 m/s, respectively, and thus was sufficiently large at each linear velocity recording. Further, the mark jitter was excellent at such a low level of from 4 to 7 nsec.

For DVD-R, C/N is usually required to be at least 45 dB, preferably at least about 55 dB. Further, if the mark jitter exceeds 10 nsec, the signal quality tends to be very poor, and the mark jitter is usually preferably at most 9 nsec.

On this disk, a 8/16 modulated random signal was recorded at a recording linear velocity of 7 m/s with a recording power of 10.2 mW under conditions substantially similar to Version 1.0 of DVD-R Standard, whereby the bottom jitter value was excellent at a low level of 8.4% in a state where intermark correction was applied, and accurate high speed recording was carried out.

At that time, the reflectivity was 43%, and the modulation was 75%.

Further, this disk was peeled between the reflective layer and the recording layer, and the colorant recording layer was washed off with ethanol, whereupon the deformation of the substrate at the recorded portions was observed by AFM, whereby no substantial irregularities were observed, and the recorded portions of the respective mark lengths had uniform shapes.

EXAMPLE 2

A bonded disk was prepared in the same manner as in Example 1 except that the dye used in Example 1 was changed to a dye having the following formula and the amount of the dye was changed to 0.040 g.

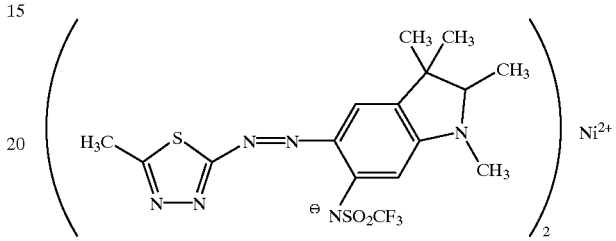

In nitrogen, the main weight reduction initiation temperature of this dye was 272° C., the weight reduction rate was 21%/min, the inclination of the weight reduction was 2.1%/° C., and the total weight reduction in this process was 47%. On the other hand, in the atmospheric air, the weight reduction % in the first weight reduction process was 73%.

The refractive index n and the extinction coefficient k at 640 nm. of the single layer of this dye were 2.50 and 0.09, respectively, and the maximum absorption was at 607 nm.

Further, the layer thickness at the land portion of this disk was 30 nm, and the groove depth on the recording layer was 65% of the groove depth of the substrate.

This disk was evaluated in the same manner as in Example 1, whereby the time (the decay time) for the reflectivity to change and reach a saturated level with a recording power of 2.0 mW, was 270 nsec and was 70% of the pulse length.

Further, C/N in a case where single frequency recording was carried out, was 59 dB, 56 dB or 54 dB at a linear velocity of 3.5 m/s, 7 m/s or 14 m/s, respectively, and thus was sufficiently large at each linear velocity recording. Further, the mark jitter was excellent at a low level of 5 nsec at 1-fold velocity recording or 7 nsec at 4-fold velocity recording.

On this disk, a 8/16 modulated random signal was recorded at a recording linear velocity of 7 m/s with a recording power of 10.4 mW under conditions substantially similar to Version 1.0 of DVD-R Standard, whereby the bottom jitter value was 9.2% in a state where intermark correction was applied, and excellent high speed recording was carried out.

At that time, the reflectivity was 42%, and the modulation was 73%.

EXAMPLE 3

A bonded disk was prepared in the same manner as in Example 1 except that the dye used in Example 1 was changed to a dye having the following formula, and the amount of the dye was changed to 0.044 g.

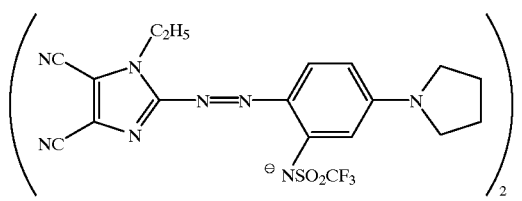

In nitrogen, the main weight reduction initiation temperature of this dye was 349° C., the weight reduction rate was 227%/min, the inclination of the weight reduction was 22.7%/° C., and the total weight reduction in this process was 40%. On the other hand, in the atmospheric air, the weight reduction % in the first weight reduction process was 29%, and the second weight reduction initiation temperature was 455° C. No weight reduction was observed in a region lower than this process.

The refractive index n and the extinction coefficient k at 640 nm of a single layer of this dye were 2.40 and 0.05, respectively, and the maximum absorption was at 584 nm.

Further, the layer thickness at the land portion of this disk was 30 nm, and the groove depth on the recording layer was 63% of the groove depth of the substrate.

This disk was evaluated in the same manner as in Example 1, whereby the time (the decay time) for the reflectivity to change and reach a saturated level with a recording power of 2.6 mW, was 320 nsec, and was 84% of the pulse length.

Further, C/N in a case where single frequency recording was carried out, was 57 dB, 56 dB or 53 dB at a linear velocity of 3.5 m/s, 7 m/s or 14 m/s, respectively. Further, the mark jitter was 5 nsec at 1-fold velocity recording or 9 nsec at 4-fold velocity recording.

On this disk, a 8/16 modulated random signal was recorded at a recording linear velocity of 7 m/s with a recording power of 12.2 mW under conditions substantially similar to Version 1.0 of DVD-R Standard, whereby the bottom jitter value was 9.0% in a state where intermark correction was applied.

Further, the reflectivity was 51%.

EXAMPLE 4

A bonded disk was prepared in the same manner as in Example 1 except that the dye used in Example 1 was changed to a dye having the following formula, and the amount of the dye was changed to 0.044 g.

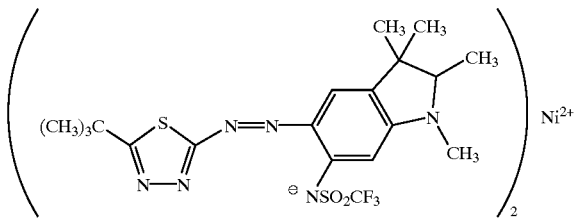

In nitrogen, the main weight reduction initiation temperature of this dye was 265° C., the weight reduction rate was 20%/min, the inclination of the weight reduction was 2%/° C., and the total weight reduction in this process was 49%. On the other hand, in the atmospheric air, the weight reduction % in the first weight reduction process was 43%, and the second weight reduction initiation temperature was 464° C.

The refractive index n and the extinction coefficient k at 640 nm of a single layer of this dye were 2.45 and 0.07, respectively, and the maximum absorption was at 601 nm.

Further, the layer thickness at the land portion of this disk was 30 nm, and the groove depth on the recording layer was 63% of the groove depth of the substrate.

This disk was evaluated in the same manner as in Example 1, whereby the time (the decay time) for the reflectivity to change and reach a saturated level with a recording power of 2.4 mW, was 340 nsec, and was 89% of the pulse length.

Further, C/N in a case where single frequency recording was carried out, was 58 dB, 57 dB or 54 dB at a linear velocity of 3.5 m/s, 7 m/s or 14 m/s, respectively. Further, the mark jitter was 6 nsec at 1-fold velocity recording and 8 nsec at 4-velocity recording.

On this disk, a 8/16 modulated random signal was recorded at a recording linear velocity of 7 m/s with a recording power of 11.2 mW under conditions substantially similar to Version 1.0 of DVD-R Standard, whereby the bottom jitter value was 9.2% in a state where intermark correction was applied.

Further, the reflectivity was 47%.

EXAMPLE 5

A bonded disk was prepared in the same manner as in Example 1 except that the dye used in Example 1 was changed to a dye having the following formula, the amount of the dye was changed to 0.048 g, and the reflective layer was changed to a silver alloy (Ag-Ti alloy (Ti 0.2 at %)).

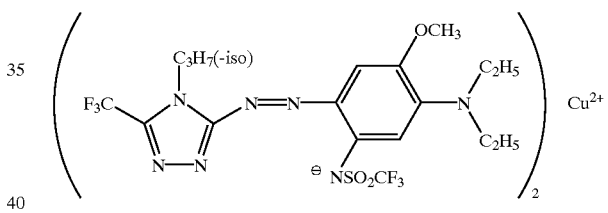

In nitrogen, the main reduction initiation temperature of this dye was 297° C., the weight reduction rate was 118%/min, the inclination of the weight reduction was 11.8%/° C., and the total weight reduction in this process was 67.5%. On the other hand, in the atmospheric air, the weight reduction % in the first weight reduction process was 54%, and the second weight reduction initiation temperature was 450° C.

The refractive index n and the extinction coefficient k at 640 nm of a single layer of this dye were 2.35 and 0.05, respectively, and the maximum absorption was at 588.5 nm.

Further, the layer thickness at the land portion of this disk was 30 nm, and the groove depth on the recording layer was 63% of the groove depth of the substrate.

Further, n and k at 640 nm of the reflective layer used for this disk were 0.165 and 4.159, respectively.

This disk was evaluated in the same manner as in Example 1, whereby the time (the decay time) for the reflectivity to change and reach a saturated level with a recording power of 3.0 mW, was 345 nsec, and was 90% of the pulse length.

Further, C/N in a case where single frequency recording was carried out, was 57 dB, 54 dB or 52 dB at a linear velocity of 3.5 m/s, 7 m/s or 14 m/s, respectively. Further, the mark jitter was 5 nsec at 1-fold velocity recording or 9 nsec at 4-fold velocity recording.

On this disk, a 8/16 modulated random signal was recorded at a recording linear velocity of 7 m/s with a recording power of 12.0 mW under conditions substantially similar to Version 1.0 of DVD-R Standard, whereby the bottom jitter value was 9.4% in a state where intermark correction was applied.

Further, the reflectivity was 48%.

COMPARATIVE EXAMPLE 1

A bonded disk was prepared in the same manner as in Example 1 except that the dye used in Example 1 was changed to a dye having the following formula, and the amount of the dye was changed to 0.044 g.

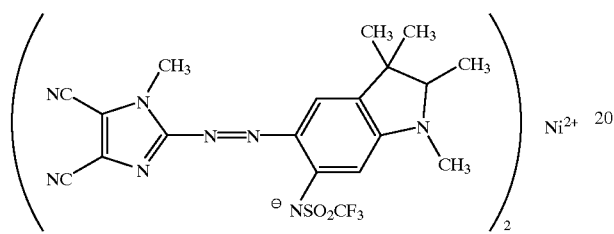

In nitrogen, the main weight reduction initiation temperature of this dye was 248° C., the weight reduction rate was 227%/min, the inclination of the weight reduction was 22.7%/° C., and the total weight reduction in this process was 40%. On the other hand, in the atmospheric air, the weight reduction % in the first weight reduction process was 29%, and the second weight reduction initiation temperature was 440° C.

The refractive index n and the extinction coefficient k at 640 nm of a single layer of this dye were 2.35 and 0.05, respectively, and the maximum absorption was at 589.5 nm.

Further, the layer thickness at the land portion of this disk was 30 nm, and the groove depth on the recording layer was 63% of the groove depth of the substrate.

This disk was evaluated in the same manner as in Example 1, whereby the time (the decay time) for the reflectivity to change and reach a saturated level with a recording power of 3.0 mW, was 800 nsec, and was 210% of the pulse length.

Further, C/N in a case where single frequency recording was carried out, was 59 dB, 54 dB or 50 dB at a linear velocity of 3.5 m/s, 7 m/s or 10.5 m/s (3-fold velocity), respectively, and thus remarkable deterioration was observed as the recording linear velocity became high. Further, the mark jitter increased to a level of 11 nsec at 3-fold velocity recording although it was good at a low level of 5 nsec at 1-fold velocity recording.

On this disk, a 8/16 modulated random signal was recorded at a recording linear velocity of 7 m/s with a recording power of 12.8 mW under conditions substantially similar to Version 1.0 of DVD-R Standard, whereby the bottom jitter value did not decrease beyond 9.8% in a state where intermark correction was applied.

Further, the deformation of the substrate of this disk was observed by AFM in the same manner as in Example 1, whereby the heights of irregularities and asymmetries in the beam scanning direction, were different depending upon the mark lengths of from 3T to 11T marks, and the differences among marks were substantial. Thus, the recorded state was not good.

The reflectivity of this disk was 51%.

COMPARATIVE EXAMPLE 2

A bonded disk was prepared in the same manner as in Example 1 except that the dye used in Example 1 was changed to a dye having the following formula, and the amount of the dye was changed to 0.048 g.

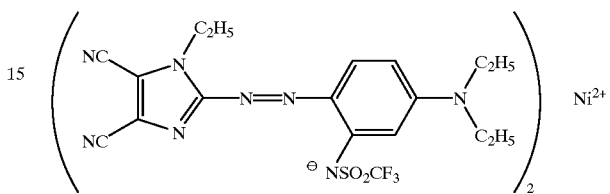

In nitrogen, the main weight reduction initiation temperature of this dye was 349.8° C., the weight reduction rate was 148%/min, the inclination of the weight reduction was 14.8%/° C., and the total weight reduction in this process was 41%. On the other hand, in the atmospheric air, the weight reduction % in the first weight reduction process was 30%, and the second weight reduction initiation temperature was 467° C.

The refractive index n and the extinction coefficient k at 640 nm of a single layer of this dye were 2.4 and 0.06, respectively, and the maximum absorption was at 595.5 nm.

Further, the layer thickness at the land portion of this disk was 30 nm, and the groove depth on the recording layer was 63% of the groove depth of the substrate.

This disk was evaluated in the same manner as in Example 1, whereby the time (the decay time) for the reflectivity to change and reach a saturated level with a recording power of 2.6 mW, was 640 nsec, and was 170% of the pulse length.

Further, C/N in the case where single frequency recording was carried out, was 58 dB or 53 dB at a linear velocity of 3.5 m/s or 7 m/s, respectively, and thus remarkable deterioration was observed as the recording linear velocity became high. Further, the mark jitter increased to a level of 10 nsec at a linear velocity of 7 m/s.

On this disk, a 8/16 modulated random signal was recorded at a recording linear velocity of 7 m/s with a recording power of 12.8 mW under conditions substantially similar to Version 1.0 of DVD-R Standard, whereby the bottom jitter value did not decrease beyond 9.8% in a state where intermark correction was applied.

Further, the deformation of the substrate of this disk was observed by AFM in the same manner as in Example 1, whereby the heights of irregularities and asymmetries in the beam scanning direction, were different depending upon the mark lengths of from 3T to 11T marks, and the differences among marks were substantial. Thus, the recorded state was not good.

The reflectivity of this disk was 51%.

TABLE 7

| | | | Example 1 | Example 2 | Example 3 | Example 4 | Example 5 | Comparative Example 1 | Comparative Example 2 |
|---|---|---|---|---|---|---|---|---|---|
| Decay time*1 | Recording power (mW) | | 1.6 | 2.0 | 2.6 | 2.4 | 3.0 | 3.0 | 2.6 |
| | Decay time (nsec) | | 160 | 270 | 320 | 340 | 345 | 800 | 640 |
| | Ratio to pulse length (%) | | 42 | 70 | 84 | 89 | 90 | 210 | 170 |
| Single frequency recording*1 | C/N (dB) | 3.5 m/s | 58 | 59 | 57 | 58 | 57 | 59 | 58 |
| | | 7 m/s | 55 | 56 | 56 | 57 | 54 | 54 | 53 |
| | | 14 m/s | 54 | 54 | 53 | 54 | 52 | 50 | — |
| | Mark jitter (nsec) | 3.5 m/s | 4 | 5 | 5 | 6 | 5 | 5 | — |
| | | 14 m/s | 7 | 7 | 9 | 8 | 9 | 11*2 | 10*3 |
| 8/16 modulated random recording | Recording power (mW) | | 10.2 | 10.4 | 12.2 | 11.2 | 12.0 | 12.8 | 12.8 |
| | Bottom jitter (%) | | 8.4 | 9.2 | 9.0 | 9.2 | 9.4 | >9.8 | >9.8 |
| | Reflectivity | | 43 | 42 | 51 | 47 | 48 | 51 | 51 |
| | Modulation | | 75 | 73 | 75 | 74 | 72 | 68 | 69 |
| Thermal characteristics of dye (in $N_2$) | Main weight reduction initiation temp. (° C.) | | 246 | 272 | 349 | 265 | 297 | 248 | 349.8 |
| | Weight reduction rate (%/min) | | 422 | 21 | 227 | 20 | 118 | 227 | 148 |
| | Inclination of weight reduction (%/° C.) | | 42 | 21 | 22.7 | 2 | 11.8 | 22.7 | 14.8 |
| | Total weight reduction (%) | | 56 | 47 | 40 | 49 | 67.5 | 40 | 41 |
| Thermal characteristics of dye (in air) | Weight reduction in the 1st weight reduction process (%) | | 71 | 73 | 29 | 43 | 54 | 29 | 30 |
| | Initiation temperature in the 2nd weight reduction process (° C.) | | — | — | 455 | 464 | 450 | 440 | 467 |
| Optical characteristics | Single recording layer (at 640 nm) | n | 2.43 | 2.50 | 2.40 | 2.45 | 2.35 | 2.35 | 2.40 |
| | | k | 0.07 | 0.09 | 0.05 | 0.07 | 0.05 | 0.05 | 0.06 |
| | | λmax | 592.5 | 607 | 584 | 601 | 588.5 | 589.5 | 595.5 |

| Common conditions for all disks | |
|---|---|
| Recording laser wavelength | 640 nm |
| Numerical apertures of objective lens | 0.6 |
| Groove depth | 150 nm |
| Groove width (half value width) | 0.28 μm |
| Track pitch | 0.80 μm |
| Spin coating rotational speed | 1,200 rpm |
| Annealing conditions | 80° C., 3 hr |
| Decay time measuring conditions | |
| Linear velocity | 0.3 m/s |
| Pulse length | 383 nsec |
| 8/16 modulated random signal recording conditions | |
| Linear velocity | 7 m/s |

*1: Linear velocity during readout was 3.5 m/s in each case.
*2: Value at 3-fold velocity (10 m/s)
*3: Value at 2-fold velocity (7 m/s)

For DVD-R, C/N is usually required to be at least 45 dB, preferably at least about 55 dB. Further, if the mark jitter exceeds 10 nsec, the signal quality tends to be very poor, and the mark jitter is preferably at most 9 nsec.

As is apparent from Table 7, with the optical recording media satisfying the prescribed values of the present invention, the reduction in C/N value is small when the recording velocity is increased from 3.5 m/s via 7 m/s to 14 m/s in signal frequency recording (i.e. the linear velocity dependency of the recording characteristics is small), and recording can be carried out satisfactorily at each linear velocity. Further, it is apparent that recording can satisfactorily be carried out at a high linear velocity also from the fact that the mark jitter value is not higher than 9 nsec even when recording was carried out at a high velocity of 14 m/s.

COMPARATIVE EXAMPLE 3

FIG. 3(A) and FIG. 3(B) in SPIE vol. 2514, 249 (1995) disclose changes in reflectivity (the quantity of reflected light) when laser beams with pulse lengths of 694 nsec and 174 nsec were irradiated at a linear speed of 0.2 m/s to CD-R having a recording layer containing a phthalocyanine dye or a cyanine dye, under a title of "the reflective voltages during recording".

These graphs show the changes with time of the quantity of reflected light, and from the data, the publication concludes that the phthalocyanine dye is better for high speed recording.

In FIG. 5, on the basis of the data in FIG. 3(A) and FIG. 3(B) of "the phthalocyanine dye" recommended in the publication, the changes in the quantities of reflected lights were normalized at the reflected light levels which reached saturation, in the same manner as in the present invention and plotted against the response time/irradiated pulse length.

As is apparent from FIG. 5, the decay time of "the phthalocyanine dye" recommended in the publication (in FIG. 5, the value of the response time/irradiated pulse length when the normalized reflectivity became 0%" is 290% of the irradiated pulse length (when the irradiated pulse length was 174 nsec) or 350% (when the irradiated pulse length was 694 nsec), which evidently does not satisfy the requirement of the present invention.

According to the present invention, it is possible to obtain a colorant type optical recording medium whereby recording/readout can be carried out at a wavelength of at most 700 nm and the recording density is high and which provides a high speed response to a laser beam for recording and is thus excellent in a high speed recording characteristic, and to provide an optical recording method. Especially, it is possible to obtain an optical recording medium whereby recording at a high speed of a linear velocity of at least 10 m/s, which used to be difficult, can be carried out satisfactorily, and recording can be carried out within a wide range of linear velocity from a low linear velocity to a high linear velocity.

What is claimed is:

1. An optical recording medium having a recording layer containing an organic colorant as the main component, whereby recording is carried out by changing the reflectivity by irradiation of a laser beam for recording having a wavelength of at most 700 nm, wherein when a light having substantially the same wavelength as the laser beam for recording and having an intensity selected from a range of from 1 to 4.5 mW and a pulse length of about 382 nsec, is irradiated while moving a portion to be irradiated of the medium at a relative velocity of 0.3 m/s to the light, the time required for the reflectivity to change and reach a saturated level, is at most 130% of said pulse length.

2. The optical recording medium according to claim 1, wherein the time required for the reflectivity to change and reach a saturated level, is at most 100% of said pulse length.

3. The optical recording medium according to claim 1, which has a resin substrate or a resin layer in contact with the recording layer.

4. The optical recording medium according to claim 1, wherein a guide groove having a groove width of from 0.2 to 0.4 μm is formed.

5. The optical recording medium according to claim 1, wherein a guide groove having a groove depth of from 100 to 180 nm is formed.

6. The optical recording medium according to claim 1, which has a reflective layer.

7. The optical recording medium according to claim 6, which has a protective layer on the reflective layer.

8. An optical recording medium having a recording layer containing an organic colorant as the main component, whereby recording is carried out by changing the reflectivity by irradiation of a laser beam for recording having a wavelength of at most 700 nm, wherein when a light having a wavelength of about 635 nm and having an intensity selected from a range of from 1 to 4.5 mW and a pulse length of about 382 nsec, is irradiated while moving a portion to be irradiated of the medium at a relative velocity of 0.3 m/s to the light, the time required for the reflectivity to change and reach a saturated level, is at most 130% of said pulse length.

9. The optical recording medium according to claim 8, wherein the time required for the reflectivity to change and reach a saturated level, is at most 100% of said pulse length.

10. The optical recording medium according to claim 8, which has a resin substrate or a resin layer, in contact with the recording layer.

11. The optical recording medium according to claim 8, wherein a guide groove having a groove width of from 0.2 to 0.4 μm is formed.

12. The optical recording medium according to claim 8, wherein a guide groove having a groove depth of from 100 to 180 nm is formed.

13. The optical recording medium according to claim 8, which has a reflective layer.

14. The optical recording medium according to claim 13, which has a protective layer on the reflective layer.

* * * * *